July 10, 1962 C. J. SCHMIDT 3,043,054
SPHERICAL SELF-SUPPORTING ENCLOSURES
Filed March 23, 1959 3 Sheets-Sheet 1

*INVENTOR.*
CLARENCE J. SCHMIDT
BY
ATTORNEY

July 10, 1962   C. J. SCHMIDT   3,043,054
SPHERICAL SELF-SUPPORTING ENCLOSURES
Filed March 23, 1959   3 Sheets-Sheet 2

*INVENTOR.*
CLARENCE J. SCHMIDT
BY
ATTORNEY

July 10, 1962     C. J. SCHMIDT     3,043,054
SPHERICAL SELF-SUPPORTING ENCLOSURES
Filed March 23, 1959     3 Sheets-Sheet 3

INVENTOR.
CLARENCE J. SCHMIDT
BY

*A.H. Oldham*

ATTORNEY

United States Patent Office 3,043,054
Patented July 10, 1962

3,043,054
SPHERICAL SELF-SUPPORTING ENCLOSURES
Clarence J. Schmidt, Cuyahoga Falls, Ohio, assignor to Goodyear Aircraft Corporation, Akron, Ohio, a corporation of Delaware
Filed Mar. 23, 1959, Ser. No. 801,056
3 Claims. (Cl. 50—52)

This invention relates to spherical self-supporting enclosures formed of modular bodies secured one to another in abutting relation and to fastening means for securing the bodies.

In providing spherical or semi-spherical enclosures such as radomes it has been found desirable to provide a self-supporting structure in which metal framework would be eliminated and the structure would be made up of units or modules which could be secured to each other for mutual support.

It is an object of the present invention to provide an enclosure of modular units assembled in spherical arrangement.

A further object is to provide for securing the modules one to another. A still further object is to restrict the use of metal in the structure to a minimum amount.

These and other objects will appear from the following description and the accompanying drawings.

Figure 1:
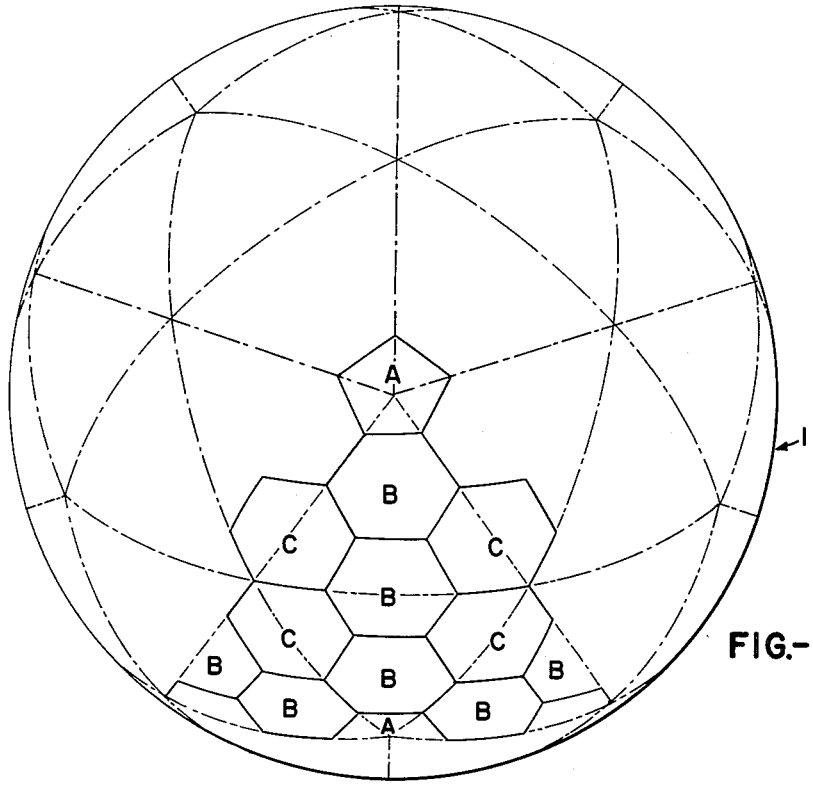
FIG. 1 is a plan view of a spherical enclosure constructed in accordance with and embodying the invention showing the modular arrangement.
Figure 2:
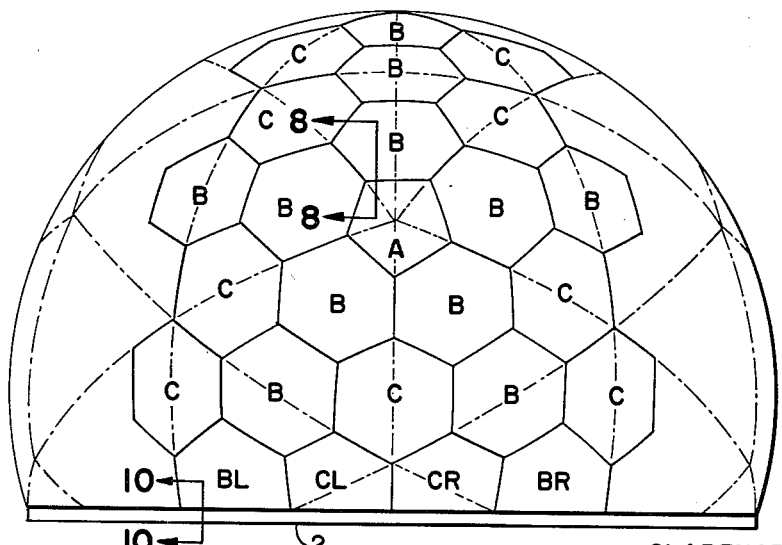
FIG. 2 is an elevational view thereof.
Figure 3:
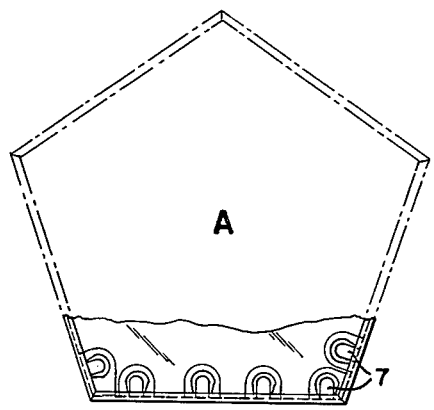
FIG. 3 is an inner face view of one of the pentagonal modules.
Figure 4:
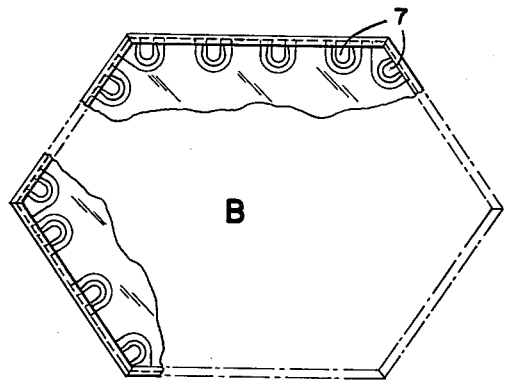
FIG. 4 is a similar view of one type of hexagonal module.
Figure 5:
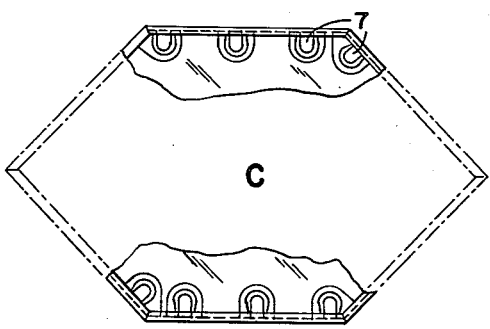
FIG. 5 is a similar view of a second type of hexagonal module.

Referring to the drawings, FIGS. 1 and 2 show a spherical enclosure 1 mounted upon a foundation 2. The word spherical as used herein is intended not only to include a complete sphere but also to include any portion of such a sphere. In the example shown the enclosure includes an arcuate span greater than 180 degrees on any vertical cross section thereof.

As pointed out in my copending application Ser. No. 799,151, filed March 13, 1959, entitled Substantially Spherical Space Enclosures. I have found that a division of the sphere by projecting a pentagonal dodecahedron radially outward onto the spherical surface will result in a division of a complete spherical surface into twelve equal and congruous spherical pentagons and that these may each be subdivided further into five spherical isosceles triangles which are equal and congruous. It has also been found that these isosceles triangles may be subdivided into polygonal areas which are not all equal insize or shape and that a subdivision of the entire spherical surface starting with the plan of the isosceles triangles drived from the spherical pentagons may be made by a division into spherical hexagons and pentagons.

The present application contemplates the building of a spherical enclosure such as that of FIG. 1 by assembly of wall units or modules corresponding in shape and size with such isosceles triangular subdivision of the spherical surface and further subdivision thereof in any manner and the division of the surface into hexagonal and pentagonal modules is given only as one example, it being understood that division into modules of other shapes could be made and modules so formed could be employed to construct a spherical enclosure without departing from the invention.

Figure 7:
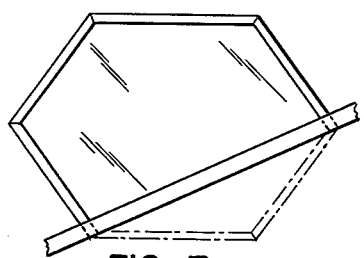
FIG. 7 is an outer face view of a base forming module illustrating its formation from a regular module.
Figure 8:
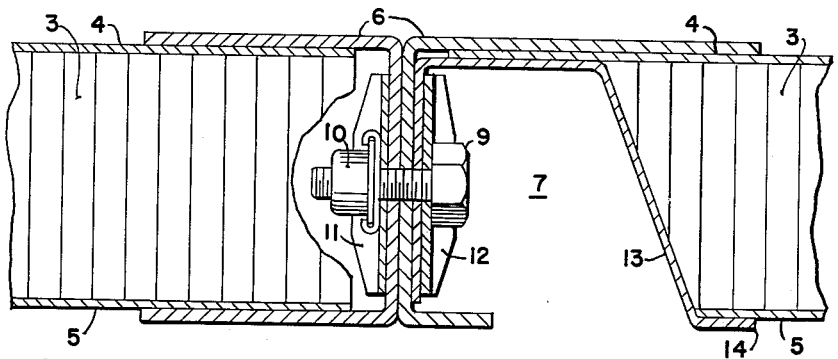
FIG. 8 is a sectional view taken on line 8—8 of FIG. 2 showing a joint construction, other portions being broken away.
Figure 9:
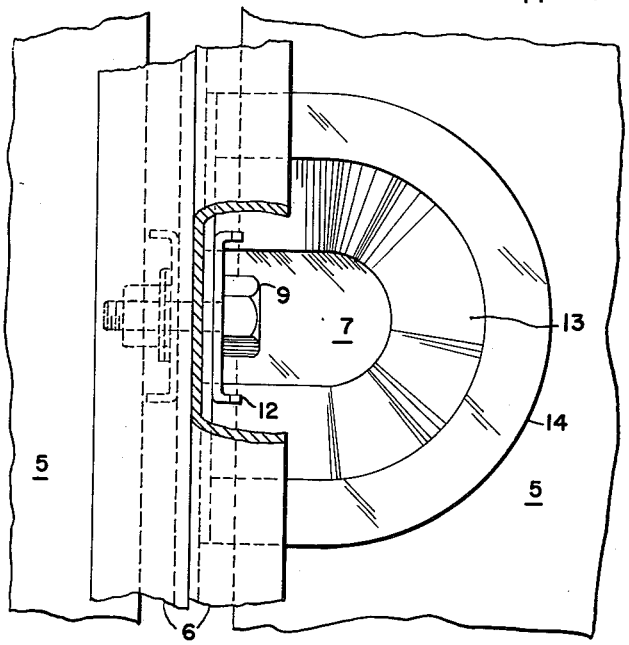
FIG. 9 is an enlarged face view of the fastening detail at line 8—8, other portions being broken away.

With the division into hexagons and pentagons as illustrated it has been found that an entire sphere could be constructed of three different types of modules and these have been designated in FIGS. 1 and 2 as A, B and C, each module being interchangeable with one having the same letter. Of these modules, module A is an equal sided pentagon. Module B has two long equal and opposite sides of which each of these two long sides of the irregular hexagonal module is equal in length to a side of module A and the other or short sides are all equal to each other. The type C modules each have four consecutive sides each equal in length to one of the short sides of the type B modules and two other consecutive sides equal in length to each other and longer than the other four sides completing an irregular hexagon. As such division of the sperical surface would not provide a base or foundation line, it would be necessary to provide modules at the base which are derived from the B and C modules by cutting or trimming them to a base line as shown in FIG. 7. Such cut modules have been indicated in FIG. 1 by the letters BR, BL, CR, and CL indicating right and left-hand trimming of B and C modules.

Each module is curved spherically and comprises a cellular body 3 of lightweight stiff material, an outer skin 4 and an inner skin 5 bonded to the body 3 and a marginal reinforcement 6 of channel shape in cross section applied about all its margins over the skins and bonded thereto.

Figure 6:
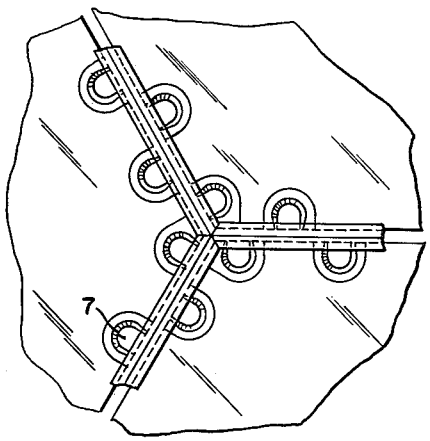
FIG. 6 is an inner face view of a joint between three adjacent modules, other portions being broken away.

For securing the modules to one another, a pocket 7 is formed in the module adjacent its margin to permit entry of a fastening member, such as the bolt 9, a passage being provided in the channels 6 of adjacent modules to clear the bolt and a nut 10 being mounted in the adjacent module for engaging the bolt to clamp the modules one to another. In the example shown the nut 10 is mounted on a channel-shaped bridge washer 11 bonded to the channel 6, the bridge washer and nut being embedded in the material of the body. Also a similar bridge washer 12 is bonded to the channel 6 of the adjacent module and is accessible through the pocket 7. However, if desired pockets may be formed in both adjacent modules so that the bolt may be entered from one pocket and the nut from the adjacent pocket. As shown in FIG. 6 the bolts are so spaced as to be staggered along the joints and provide room for tightening them.

Each pocket is lined with a reinforcing lining 13 formed to shape and overlapping the skin 5 as at 14 and bonded thereto.

The body 3 of the module may be of sheet material arranged in honeycomb fashion and may be of paper, plastic or plastic reinforced fibrous sheet material or the body may be of foamed plastic material such as polyurethane styrene foam. The skin layers 4 and 5, the pocket lining 13 and the channel reinforcements 6 are preferably made of glass fiber resin laminate in which glass fibers are bonded together by a plastic resin material such as polyester or acrylic resin.

In constructing the modules, a flat body sheet of honeycomb material or foamed plastic may be laid between two skin sheets of fiber resin laminate in wet condition and the laminate or sandwich so formed may be confined between spherically curved molding plates where it is held while the materials are bonded together in any well known manner as by polymerizing agents in the composition or by heat applied thereto or developed therein. After the spherical laminate sheet is formed it is cut to the shape and size of the desired module and portions thereof are routed away to provide the pockets 7. The pocket linings 13 are cemented or otherwise secured in place. The marginal channel reinforcements must be curved to a great circle of the sphere. They are molded to the desired curvature and the fastening means bonded thereto over openings therethrough. The formed channels are cut to the desired length, mitered, and assembled in place over the margins of the laminate and bonded in place.

Figure 10:
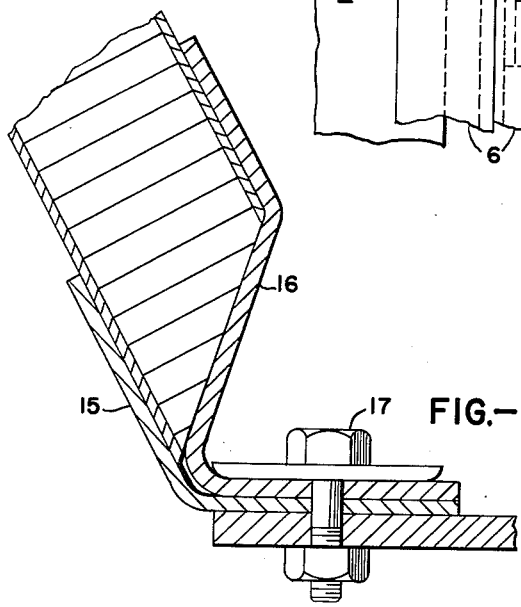
FIG. 10 is a sectional view taken on line 10—10 of FIG. 1 showing the foundation anchorage.

The base modules BR, BL are made in similar manner to the B modules. However, part of the module is trimmed away as shown in FIG. 7 along a straight line representing the base line at the foundation and where the enclosure is greater than a hemisphere so that the walls incline outwardly at the base as in FIG. 1, the cut is made at an acute angle to one of the faces thereof as shown in FIG. 10 and that edge of the module is enclosed by reinforcing layers 15 and 16 of sheet material such as fiberglass laminate bonded thereto, the layers 15 and 16 being bonded one to another beyond the acute edge of the module and turned at an angle thereto such as to meet a horizontal foundation surface to which they may be anchored by bolts 17 as shown in FIG. 10.

The base modules CR and CL are made from C modules in similar manner.

This construction provides a set of a small number of types of modules and except for the courses immediately meeting a foundation will permit building a spherical enclosure with only three kinds of modules which may be assembled by relatively unskilled workers. The resulting structure will be light in weight and strong and will contain a minimum amount of metal and will be free of frame structure.

Thus it will be seen that the objects of the invention have been accomplished.

While a certain representative embodiment and details have been shown for the purpose of illustrating the invention, it will be apparent to those skilled in this art that various changes and modifications may be made therein without departing from the spirit or scope of the invention.

I claim:

1. A spherical self-supporting enclosure comprising stiff non-metallic modular bodies abutting each other in edge to edge relation in planes radial to the sphere, each body comprising a pair of parallel spherically curved face layers of resin bonded fiberglass, a honeycomb filling of resin bonded fiberglass between said face layers and bonded thereto, a channel-shaped marginal reinforcing wall of resin-bonded fiberglass extending about the modular body with its margins overlapping and bonded to the face layers, a pocket formed in a module adjacent its marginal reinforcing wall, lining means of resin-bonded fiberglass for the pocket, and fastening means insertable through said pocket, the lining means for the pocket, and the marginal wall securing an adjacent module thereto.

2. In a spherical self-supporting enclosure, a plurality of stiff modular units of uniform thickness but several different shapes assembled in edge to edge relation, and with the outer and inner surfaces thereof curved uniformly to the curvatures of outer and inner spheres, each unit having fiberglass and resin outer and inner surface skins and an interposed honeycomb filler of fiberglass and resin, an integrally molded U-shaped fiberglass and resin channel surrounding the marginal edge of each unit and extending radially of the spherical surfaces thereof, a plurality of pocket forming members of fiberglass and resin along certain edges of each unit, each member having a flat flange lying on the base of the U-shaped channel, a right angle flange connected to the flat flange and lying in engagement with the inside of one surface skin, an angular curved cup-shaped flange connected to the right angle flange and engaging the honeycomb filler, a flange at the outer periphery of the cup-shaped flange and engaging the outer surface of the second surface skin, the second surface skin and honey-comb filler being cut away to receive the pocket forming member, and fastening means positioned down in each pocket forming member and extending through holes in the bottoms of the U-shaped channels and the flat flange of a pocket forming member for securing adjacent units together.

3. In a spherical self-supporting enclosure, a plurality of stiff modular units of uniform thickness but several different shapes assembled in edge to edge relation, and with the outer and inner surfaces thereof curved uniformly to the curvatures of outer and inner spheres, each unit having fiberglass and resin outer and inner surface skins and an interposed honeycomb filler of fiberglass and resin, an integrally molded U-shaped fiberglass and resin channel surrounding the marginal edge of each unit and extending radially of the spherical surfaces thereof, a plurality of pocket forming members of fiberglass and resin along certain edges of each unit, each member having flange means engaging and secured to the U-shaped channel, both surface skins, and the honeycomb filler, the second surface skin and honeycomb filler being cut away to receive the pocket forming member, and fastening means positioned down in each pocket forming member and extending through holes in the bottoms of the U-shaped channels and the flat flange of a pocket forming member for securing adjacent units together.

References Cited in the file of this patent

UNITED STATES PATENTS

| | | |
|---|---|---|
| 2,423,199 | Milnor | July 1, 1947 |
| 2,441,188 | Earhart | May 11, 1948 |
| 2,682,235 | Fuller | June 29, 1954 |
| 2,805,974 | Brucker | Sept. 10, 1957 |
| 2,918,992 | Gelsavage | Dec. 29, 1959 |

OTHER REFERENCES

Modern Plastics, vol. 28, July 1951, pages 84–87.